US012620582B2

(12) United States Patent
Wang et al.

(10) Patent No.: US 12,620,582 B2
(45) Date of Patent: May 5, 2026

(54) NEGATIVE ELECTRODE OF LITHIUM ION SECONDARY BATTERY, PREPARATION METHOD THEREOF AND LITHIUM ION SECONDARY BATTERY

(71) Applicant: MURATA MANUFACTURING CO., LTD., Kyoto (JP)

(72) Inventors: Li Wang, Shanghai (CN); Yan Zhou, Shanghai (CN); Yuli Li, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 1074 days.

(21) Appl. No.: 17/706,189

(22) Filed: Mar. 28, 2022

(65) Prior Publication Data

US 2022/0352508 A1      Nov. 3, 2022

(30) Foreign Application Priority Data

Apr. 28, 2021    (CN) .......................... 202110467948.8

(51) Int. Cl.
| | |
|---|---|
| *H01M 4/38* | (2006.01) |
| *H01M 4/02* | (2006.01) |
| *H01M 4/04* | (2006.01) |
| *H01M 4/62* | (2006.01) |
| *H01M 4/66* | (2006.01) |
| *H01M 10/0525* | (2010.01) |

(52) U.S. Cl.
CPC ......... *H01M 4/382* (2013.01); *H01M 4/0457* (2013.01); *H01M 4/625* (2013.01); *H01M 4/662* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 6,706,447 B2 * | 3/2004 | Gao | ...................... | H01M 4/387 |
| | | | | 429/231.95 |
| 9,166,222 B2 * | 10/2015 | Amiruddin | ........... | C01G 51/50 |
| 12,113,203 B2 * | 10/2024 | Chae | ................... | H01M 4/0452 |
| 2013/0045427 A1 | 2/2013 | Zhamu et al. | | |
| 2020/0403230 A1 | 12/2020 | Suk et al. | | |
| 2022/0006074 A1 * | 1/2022 | Kim | .................... | H01M 10/052 |

FOREIGN PATENT DOCUMENTS

| | | | | |
|---|---|---|---|---|
| CN | 1400680 | 3/2003 | | |
| CN | 109659487 A | 4/2019 | | |
| CN | 110071265 A | 7/2019 | | |
| CN | 112599723 | 4/2021 | | |
| EP | 4040546 A1 * | 8/2022 | ........... | H01M 4/587 |
| JP | 2011-1029075 | 2/2011 | | |
| JP | 2011-199210 | 10/2011 | | |

OTHER PUBLICATIONS

Chinese Office Action issued Nov. 21, 2024 in corresponding Chinese Application No. 202110467948.8.
Japanese Office Action issued Mar. 14, 2023 in corresponding Japanese Application No. 2022-063999.

* cited by examiner

*Primary Examiner* — Maria Laios
(74) *Attorney, Agent, or Firm* — K&L Gates LLP

(57) ABSTRACT

The present invention provides a negative electrode of lithium ion secondary battery, a preparation method thereof and a lithium ion secondary battery. The negative electrode of the lithium ion secondary battery comprises a negative electrode active material, a pre-lithiated conductive layer and a negative electrode current collector. By using the negative electrode of lithium ion secondary battery, the preparation method thereof and the lithium ion secondary battery of the present invention, technical effects of excellent electrochemical performance, especially excellent first discharge capacity and first time efficiency are achieved, and excellent negative electrode plate binding force is achieved.

8 Claims, No Drawings

NEGATIVE ELECTRODE OF LITHIUM ION SECONDARY BATTERY, PREPARATION METHOD THEREOF AND LITHIUM ION SECONDARY BATTERY

TECHNICAL FIELD

The present invention relates to the field of lithium ion secondary batteries, in particular to an negative electrode of lithium ion secondary battery, preparation method thereof and lithium ion secondary battery.

BACKGROUND

In recent years, along with the continuous development of electronic technology, the requirements for people to a battery device for supporting the energy supply of electronic device are also increased. Nowadays, batteries capacity of storing a high amount of electricity and outputting high power are needed. Traditional lead-acid batteries, nickel-metal hydride batteries and the like may not meet the requirements of new electronic products. Therefore, lithium batteries have been attracted an extensive attention of the people. During the development process of lithium battery, capacity and performance thereof have been effectively improved.

However, due to the active chemical properties of metal lithium, during the use of lithium ion secondary batteries, lithium ions may unevenly precipitate on the current collector during charging, so that the lithium dendrites are generated. Moreover, in the process of charging and discharging, undesired reactions between lithium ions and electrolyte may occur, resulting in problems such as lithium loss and the like. In order to solve the above problems, the prior art usually adopts the method of direct pre-lithiation of the negative electrode current collector. However, the direct pre-lithiation of the negative electrode current collector will lead to the disadvantages such as decreased adhesion of the negative electrode plate, lower first discharge capacity and the like. Therefore, it is still necessary to develop a novel pre-lithiation method of a negative electrode of lithium ion secondary battery and a negative electrode and lithium ion secondary battery manufactured therefrom.

SUMMARY

The main object of the present invention is to provide a negative electrode of lithium ion secondary battery, a preparation method thereof and a lithium ion secondary battery, so as to solve the problems such as decreased adhesion of the electrode plate, low first discharge capacity and the like in the prior art.

For achieving the above object, according to one aspect of the present invention, a negative electrode of lithium ion secondary battery is provided. The negative electrode comprises a negative electrode active material, a pre-lithiated conductive layer and an negative electrode current collector.

Further, in the above negative electrode of lithium ion secondary battery, the thickness of the pre-lithiated conductive layer is in a range of about 1 to about 50 µM, preferably about 1 to about 20 µM, and more preferably about 1 to about 10 µM.

Further, in the above negative electrode of lithium ion secondary battery, the pre-lithiated conductive layer is a pre-lithiated material doped conductive material, or a laminate of the pre-lithiated material layer and the conductive material layer, wherein the amount of the pre-lithiated material is in a range of about 10 wt % to about 50 wt % based on the total weight of the pre-lithiated conductive layer.

Further, in the above negative electrode of lithium ion secondary battery, the conductive material comprises carbon black, carbon nanotube, graphene, vapor grown carbon fiber, Ketjen black, polyacetylene, polythiophene, polypyrrole, polyaniline, polyphenylene, polyphenylene vinylene, polydiacetylene, or any combination thereof.

Further, in the above negative electrode of lithium ion secondary battery, the negative electrode current collector comprises copper foil, copper mesh, foamy copper, nickel foil, nickel mesh, foamy nickel, stainless steel foil, stainless steel mesh, or any combination thereof.

Further, in the above negative electrode of lithium ion secondary battery, the pre-lithiated conductive layer is a laminate of the pre-lithiated material layer and the conductive material layer, wherein the pre-lithiated conductive layer comprises a lithium diffusion region, and the lithium diffusion region is about 1% to about 100% of the total thickness of the pre-lithiated conductive layer.

Further, in the above negative electrode of lithium ion secondary battery, the negative electrode current collector is a pre-lithiated negative electrode current collector.

According to another aspect of the present invention, a method for preparing a negative electrode of lithium ion secondary battery is provided. The method comprises: step S1, doping a pre-lithiated material into a conductive material, and dispersing the pre-lithiated material and the conductive material in a solvent to form a conductive material slurry; step S2, coating the conductive material slurry on the negative electrode current collector, and curing to form a pre-lithiated conductive layer on the negative electrode current collector; and step S3, coating a negative electrode active material slurry on the pre-lithiated conductive layer, and curing to form the negative electrode of lithium ion secondary battery.

Further, in the above method, the pre-lithiated material comprises passivated lithium powder.

Further, in the above method, the thickness of the pre-lithiated conductive layer is in a range of about 1 to about 50 µM, preferably about 1 to about 20 µM, and more preferably about 1 to about 10 µM.

Further, in the above method, the step S1 comprises doping the pre-lithiated material into the conductive material under vacuum, drying conditions or dew point ≤−40° C., at a temperature range of about −20° C. to about 40° C., and stirring for about 2 minutes to about 2880 minutes at a stirring speed of about 5 rpm to about 2000 rpm to disperse the pre- lithiated material and the conductive material into the solvent.

Further, in the above method, the conductive material slurry is cured at a temperature range of about 90° C. to about 120° C.

Further, in the above method, the amount of the pre-lithiated material is in a range of about 10 wt % to about 50 wt % based on the total weight of the pre-lithiated conductive layer.

According to another aspect of the present invention, a method for preparing a negative electrode of lithium ion secondary battery is provided. The method comprises: step S1, coating the conductive material slurry on the negative electrode current collector, and curing to form a conductive layer on the negative electrode current collector; step S2, pre-lithiating the conductive layer with the pre-lithiated material to form a pre-lithiated conductive layer; and step S3, coating a negative electrode active material slurry on the pre-lithiated conductive layer, and curing to form the negative electrode of lithium ion secondary battery.

Further, in the above method, in step S2, the pre-lithiation comprises any of the following: laminating a lithium foil or lithium powder to the conductive layer; coating the molten lithium on the conductive layer and cooling to form a lithium layer; or electroplating lithium to the surface of the negative electrode current collector and the conductive layer.

Further, in the above method, the thickness of the pre-lithiated conductive layer is in a range of about 1 to about 50 μM, preferably about 1 to about 20 μM, and more preferably about 1 to about 10 μM.

Further, in the above method, the lithium foil or lithium powder is laminated to the conductive layer under vacuum, drying conditions or dew point ≤−40° C., at a temperature range of about −50° C. to about 40° C.

Further, in the above method, the molten lithium is coated on the conductive layer at a temperature range of about 180° C. to 400° C. and cooled at a temperature range of about −20° C. to about 40° C.

Further, in the above method, the negative electrode current collector and the surface of the conductive layer are immersed in a solution containing lithium salt and electroplated at a voltage greater than 0 V and less than or equal to about 1.5 V for about 1 minute to about 600 minutes.

According to another aspect of the present invention, a lithium ion secondary battery is provided. The lithium ion secondary battery comprises a positive electrode, a negative electrode, a separator, and a non-aqueous electrolyte, wherein the negative electrode is the negative electrode of the lithium ion secondary battery according to the present invention or the negative electrode of the lithium ion secondary battery prepared according to the method of the present invention.

By using the negative electrode of the lithium ion secondary battery, the preparation method thereof and the lithium ion secondary battery of the present invention, technical effects of excellent electrochemical performance, especially excellent first discharge capacity and first time efficiency are achieved, and excellent negative electrode plate binding force is achieved.

DETAILED DESCRIPTION OF THE EMBODIMENTS

It is noted that the embodiments in the present invention and the features in the embodiments may be mutually combined with each other without departing from the spirit of the present disclosure. The present invention will be described in detail below with reference to the embodiments.

As described in the background, in the prior art, the pre-lithiation operation of the negative electrode current collector is adopted. However, since such technical solution may not effectively solve the problems of poor adhesion force of the negative electrode plate and low first discharge capacity, there is still a need to improve the pre-lithiation method in the prior art. In view of the problems in the prior art, according to a typical embodiment of the present invention, a negative electrode of lithium ion secondary battery is provided. The negative electrode of lithium ion secondary battery comprises a negative electrode active material, a pre-lithiated conductive layer and an negative electrode current collector.

In various embodiments of the present invention, the negative electrode of lithium ion secondary battery comprises a pre-lithiated conductive layer. The pre-lithiated conductive layer is arranged between the negative electrode active material and the negative electrode current collector. The pre-lithiation method in the prior art usually adopts the direct pre-lithiation operation to the negative electrode current collector, which will eventually form an negative electrode plate inserted into lithium layers. The lithium layer does not have good adhesion with the negative electrode current collector and the conductive layer. Therefore, the peel strength of the formed negative electrode plate will be adversely reduced.

Different from the method in the prior art, in the case of adopting the negative electrode of lithium ion secondary battery of the present invention, due to the technical solution of pre-lithiation of the conductive layer is adopted, there is only a conductive layer that may play an adhesion role between the negative electrode active material layer and the negative electrode current collector, good adhesion of negative electrode plate is achieved. In addition, in the prior art that pre-lithiation is only applied on the negative electrode current collector, the lithium layer as a separate layer exists between the negative electrode current collector and the conductive layer, which may not effectively improve the conductive efficiency of the conductive layer. The lithium ion in the electrolyte still needs to pass through the conductive layer to be embedded into the negative electrode active material layer. Therefore, the method in the prior art may not improve the electrical performance of lithium ion secondary battery.

Different from the method of the prior art, the negative electrode of lithium ion secondary battery of the present invention adopts the solution of pre-lithiation for the conductive layer. After the pre-lithiation of the conductive layer, the lithium element existing in the conductive layer may effectively improve the conductivity of the conductive layer, so as to increase the first discharge capacity and the initial cycle efficiency of the resulting lithium ion secondary battery. The conductive layer of the negative electrode current collector reduces the internal resistance of the negative electrode. The lithium in the pre-lithiated conductive layer may compensate the lithium ion loss of the negative electrode during the use of the lithium ion battery, so as to effectively improve the first time efficiency of the battery.

In various embodiments of the present invention, the thickness of the pre-lithiated conductive layer is in a range of about 1 to about 50 μM, preferably about 1 to about 20 μM, and more preferably about 1 to about 10 μM. When the thickness of the pre-lithiated conductive layer is less than about 1 μM, the pre-lithiation effect is poor, thus it may not effectively improve the conductivity of the conductive layer. When the thickness of the pre-lithiated conductive layer is greater than about 50 μM, the conductive layer is too thick, so it may hinder the penetration of lithium ions, and adversely increase the resistance and reduce the energy density of the battery, so as to degrade the electrical performance of the lithium ion secondary battery.

In various embodiments of the present invention, for different examples, the minimum value of the thickness of the pre-lithiated conductive layer may be about 1 μM, about 2 μM, about 3 μM, about 4 μM, about 5 μM, about 6 μM, about 7 μM, about 8 μM, about 9 μM or about 10 μM, and the maximum value of the thickness of the pre-lithiated conductive layer may be about 50 μM, about 45 μM, about 40 μM, about 35 μM, about 30 μM, about 25 μM, about 20 μM or about 15 μM. Specifically, the thickness of the pre-lithiated conductive layer may be in the following ranges: about 1 μM to about 50 μM, about 1 μM to about 40 μM, about 1 μM to about 30 μM, about 1 μM to about 20 μM, about 1 μM to about 10 μM, about 10 μM to about 20 μM, about 10 μM to about 30 μM, about 10 μM to about 40 μM, about 10 μM to about 50 μM, about 2 μM to about 50 μM, about 2 μM to about 45 μM, about 3 μM to about 40 μM, about 4 μM to about 35 μM, about 5 μM to about 30 μM, about 6 μM to about 25 μM, about 7 μM to about 20 μM, about 8 μM to about 15 μM or about 9 μM to about 10 μM.

In various embodiments of the present invention, the pre-lithiated conductive layer is a pre-lithiated material doped conductive material, or a laminate of the pre-lithiated material layer and the conductive material layer. The amount of the pre-lithiated material is in a range of about 10 wt % to about 50 wt % based on the total weight of the pre-lithiated conductive layer. In some embodiments, the pre-lithiated conductive layer is a pre-lithiated material doped conductive material, wherein the pre-lithiated material may be passivated lithium powder, lithium oxide, lithium silicide, lithium nitride and any lithium containing compound that may provide lithium element. In the embodiment of using the pre-lithiated material doped conductive material, the pre-lithiated material may be well mixed with the conductive material to form a fully mixed homogeneous form. The pre-lithiated material uniformly improves the conductivity of the conductive layer, so as to effectively improve the electrical performance of the resulting lithium ion secondary battery. In some other embodiments, the pre-lithiated conductive layer is a laminate of a pre-lithiated material layer and a conductive material layer. In these embodiments, the pre-lithiated material is a lamellar shape, which comprises lithium foil, lithium ingot, and lamellar materials of lithium oxide, lithium silicide and lithium nitride. In the laminate, the pre-lithiated material layer and the conductive material layer are stacked in turn to form a compact laminate. In some embodiments of the invention, the laminate may comprise one pre-lithiated material layer and one conductive material layer. In other embodiments, the laminate may comprise a plurality of pre-lithiated material layers and a plurality of conductive material layers stacked with each other.

In various embodiments of the present invention, the conductive material comprises carbon black, carbon nanotube, graphene, vapor grown carbon fiber, Ketjen black, polyacetylene, polythiophene, polypyrrole, polyaniline, polyphenylene, polyphenylene vinylene, polydiacetylene, or any combination thereof. In addition, in addition to the carbon material, any metal material or conductive polymer that is a conductive material may be used.

In various embodiments of the present invention, the negative electrode current collector comprises copper foil, copper mesh, foamy copper, nickel foil, nickel mesh, foamy nickel, stainless steel foil, stainless steel mesh, or any combination thereof.

In various embodiments of the present invention, the pre-lithiated conductive layer is a laminate of the pre-lithiated material layer and the conductive material layer, wherein the pre-lithiated conductive layer comprises a lithium diffusion region, and the lithium diffusion region is about 1% to about 100% of the total thickness of the pre-lithiated conductive layer. In various embodiments of the present invention, in the laminate of the laminate of the pre-lithiated material layer and the conductive material layer, the pre-lithiated material may be fully or partially diffused into the conductive material layer. For different embodiments, the lithium diffusion region is, for example, about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99% or about 100% of the total thickness of the pre-lithiated conductive layer. In different embodiments, different diffusion degrees may be selected according to different combination of pre-lithiated materials and conductive layer materials. In the most preferable embodiment, the pre-lithiated material and the conductive layer material are diffused each other completely, i.e. the lithium diffusion region is 100% of the total thickness of the pre-lithiated conductive layer.

In various embodiments of the present invention, the negative electrode current collector is a pre-lithiated negative electrode current collector. The negative electrode current collector in the negative electrode of lithium ion secondary battery of the present invention may also be pre-lithiated by means of the pre-lithiation of the conductive layer using the pre-lithiated material. In the embodiment in which the pre-lithiated conductive layer is a pre-lithiated material doped conductive material, when there are relatively abundant doped pre-lithiated materials, the pre-lithiated material contacted with the negative electrode current collector will penetrate into the negative electrode current collector, so that the negative electrode current collector is pre-lithiated accordingly. In some other embodiments, on the basis of using the pre-lithiated material doped conductive material, the pre-lithiated material is additionally used to pre-lithiate the negative electrode current collector, so that the pre-lithiation of the negative electrode current collector may be further carried out without reducing the pre-lithiated material in the pre-lithiated conductive layer. In the embodiment in which the pre-lithiated material layer and the conductive material layer form a laminate, the pre-lithiated material layer may be formed between the conductive layer and the negative electrode current collector. In such case, the pre-lithiated material layer does not penetrate with the conductive layer to form a lithium diffusion region and may penetrate into the negative electrode current collector, so as to apply the pre-lithiation to both of the conductive layer and the negative electrode current collector. In addition, in a further embodiment, when the pre-lithiated material layer and the conductive material layer form a completely interpenetrative laminate (the lithium diffusion region is 100% of the total thickness of the pre-lithiated conductive layer), an additional pre-lithiated material layer may be added between the pre-lithiated conductive layer and the negative electrode current collector, so as to apply the pre-lithiation to both of the negative electrode current collector and the conductive layer. When the pre-lithiation of both the conductive layer and the negative electrode current collector is applied, the lithium ion secondary battery containing the negative electrode of the invention will have better electrical performance.

According to another typical embodiment of the present invention, a method for preparing a negative electrode of lithium ion secondary battery is provided. The method comprises: step S1, doping the pre-lithiated material into the conductive material, and dispersing the the pre-lithiated material and the conductive material in a solvent to form a conductive material slurry; step S2, coating the conductive material slurry on the negative electrode current collector, and curing to form a pre-lithiated conductive layer on the negative electrode current collector; and step S3, coating a negative electrode active material slurry on the pre-lithiated conductive layer, and curing to form the negative electrode of lithium ion secondary battery.

In various embodiments of the present invention, the conductive material slurry is formed by doping a pre-lithiated material into a slurry of a conductive material. The conductive material comprises but is not limited to carbon black, carbon nanotube, graphene, vapor grown carbon fiber, Ketjen black, polyacetylene, polythiophene, polypyrrole, polyaniline, polyphenylene, polyphenylene vinylene, polydiacetylene, or any combination thereof. In the formed conductive slurry, the mixture of the pre-lithiated material and the conductive material is homogeneous. The slurry of the conductive material is a homogeneous mixture of the conductive material and a solvent, wherein the solvent may comprise, but is not limited to N-methylpyrrolidone (NMP), dimethylacetamide (DMAC), N, N-dimethylformamide (DMF), triethyl phosphate (TEP), dimethyl sulfoxide (DMSO), or any combination thereof. In addition, in a preferred embodiment, the slurry of the conductive material may further comprise polyvinylidene fluoride (PVDF) as an adhesive. The solid content of the formed conductive material slurry is in a range of about 10% to about 20%. Then, the formed conductive material slurry is coated on one side or both sides of the negative electrode current collector, and heated for curing to form a pre-lithiated conductive layer. In the present invention, the negative electrode current collector used comprises but is not limited to copper foil, copper mesh, foamy copper, nickel foil, nickel mesh, foamy nickel, stainless steel foil, stainless steel mesh, or any combination thereof. Then, the negative electrode active material and the adhesive are mixed to prepare the negative electrode mixture, and the negative electrode active material slurry is prepared by dispersing the negative electrode mixture in the solvent. The solvent used in the negative electrode active material slurry may comprise, but is not limited to N-methylpyrrolidone (NMP), dimethylacetamide (DMAC), N, N-dimethylformamide (DMF), triethyl phosphate (TEP), dimethyl sulfoxide (DMSO), or any combination thereof. The formed negative electrode active material slurry is coated on the pre-lithiated conductive layer, and dried and cured at a temperature range of about 90° C. to about 120° C., so as to form the negative electrode of lithium ion secondary battery of the present invention. The negative electrode of lithium ion secondary battery prepared by the method of the present invention comprises a pre-lithiated conductive layer. Since the negative electrode contains high lithium content, it has excellent conductive properties, which may effectively increase the conductivity of the conductive layer, and therefore increase the first discharge capacity and the initial cycle efficiency of the lithium ion secondary battery.

In various embodiments of the present invention, the pre-lithiated material comprises passivated lithium powder. The passivated lithium powder may be any commercially available passivated lithium powder, such as the passivated lithium powder with the trademark SLMP™ from Manufacturer FMC Lithium. In the present invention, the purity of the passivated lithium powder is in a range of about 97.5 wt. % to about 100 wt %. Since high purity of lithium powder is used for pre-lithiation operation, the conductivity of the formed pre-lithiated conductive layer will be further improved. In addition, in the case of using passivated lithium powder, the lithium element in the pre-lithiated conductive layer may penetrate into the negative electrode current collector, so as to form a negative electrode in which the conductive layer and the negative electrode current collector are both pre-lithiated, and therefore, the electrical performance of the lithium ion secondary battery may be further improved.

In various embodiments of the present invention, the thickness of the pre-lithiated conductive layer is in a range of about 1 to about 50 μM, preferably about 1 to about 20 μM, and more preferably about 1 to about 10 μM. When the thickness of the pre-lithiated conductive layer is less than about 1 μM, the pre-lithiation effect is poor, thus it may not effectively improve the conductivity of the conductive layer. When the thickness of the pre-lithiated conductive layer is greater than about 50 μM, the conductive layer is too thick, so it may hinder the penetration of lithium ions, and adversely increase the resistance, so as to degrade the electrical performance of the lithium ion secondary battery.

In various embodiments of the present invention, the step S1 comprises doping the pre-lithiated material into the conductive material under vacuum, drying conditions or dew point $\leq -40°$ C., at a temperature range of about $-20°$ C. to about 40° C., and stirring for about 2 minutes to about 2880 minutes at a stirring speed of about 5 rpm to about 2000 rpm to disperse the pre-lithiated material and the conductive material into the solvent. In step S1, since the pre-lithiated material is usually an active lithium element (elementary substance) or lithium compound, the pre-lithiated material is subjected to doping operation under vacuum, drying conditions or ultra-low humidity at dew point $\leq -40°$ C. At the temperature of about $-20°$ C. to about 40° C., the pre-lithiated material may be well mixed with the conductive material to be uniform. In some preferred embodiments of the present invention, the temperature at which the doping operation is performed may be in a range of about $-20°$ C. to about 40° C., a range of about $-10°$ C. to about 30° C., or a range of about 0° C. to about 20° C. In addition, after mixing the pre-lithiated material with the conductive material, it may be stirred at a stirring speed of about 5 rpm to about 2000 rpm for about 2 minutes to about 2880 minutes to disperse in the solvent, so as to make the formed conductive material slurry more uniform. Preferably, in some other embodiments, the stirring speed may be in a range of about 10 rpm to about 1800 rpm, a range of about 50 rpm to about 1500 rpm, a range of about 100 rpm to about 1200 rpm, a range of about 200 rpm to about 1000 rpm, or a range of about 500 rpm to about 800 rpm. Moreover, in some preferred embodiments, the stirring time may also be in a range of about 5 minutes to about 48 hours, a range of about 10 minutes to about 36 hours, a range of about 0.5 hours to about 24 hours, a range of about 1 hour to about 12 hours, a range of about 5 hours to about 15 hours, or a range of about 10 hours to about 12 hours. In addition, in a further embodiment of the present invention, the conductive material slurry may be cured at a temperature range of about 90° C. to about 120° C. Within the above temperature range, the pre-lithiated material and the conductive material in the conductive material slurry may be well cured into a whole in a homogeneous form without the problems of delamination and discontinuity. In addition, at the above curing temperature, the lithium containing material (or lithium element) in the conductive material slurry will not react with other substances, so as to ensure that the conductive properties of the finally formed pre-lithiated conductive layer is within an appropriate range. In some preferred embodiments of the present invention, the temperature for curing the conductive material slurry may be in a range of about 95° C. to about 110° C., a range of about 100° C. to about 105° C., or a range of about 90° C. to about 100° C.

In various embodiments of the present invention, the amount of the pre-lithiated material is in a range of about 10 wt % to about 50 wt % based on the total weight of the pre-lithiated conductive layer. In the above range, the pre-lithiated material may effectively improve the conductivity of the conductive layer. In a preferred embodiment, for different examples, the amount of the pre-lithiated material is in a range of about 10 wt % to about 50 wt %, about 11 wt % to about 50 wt %, about 12 wt % to about 50 wt %, about 13 wt % to about 50 wt %, about 14 wt % to about 50 wt %, about 15 wt % to about 50 wt %, about 16 wt % to about 50 wt %, about 17 wt % to about 50 wt %, about 18 wt % to about 50 wt %, about 19 wt % to about 50 wt %, about 20 wt % to about 50 wt %, about 10 wt % to about 45 wt %, about 10 wt % to about 40 wt %, about 10 wt % to about 35 wt %, about 10 wt % to about 30 wt % or about 10 wt % to about 20 wt %, based on the total weight of the pre-lithiated conductive layer.

According to another typical embodiment of the present invention, a method for preparing a negative electrode of lithium ion secondary battery is provided. The method comprises: step S1, coating the conductive material slurry on the negative electrode current collector, and curing to form a conductive layer on the negative electrode current collector; step S2, pre-lithiating the conductive layer with the pre-lithiated material to form a pre-lithiated conductive layer; and step S3, coating the negative electrode active material slurry on the pre-lithiated conductive layer, and curing to form the negative electrode of lithium ion secondary battery.

In some embodiments, according to the method of the present invention, the slurry containing a conductive material may be firstly coated on the negative electrode current collector and cured to form a conductive layer. Then, the formed conductive layer is pre-lithiated. After the pre-lithiation is performed, the conductive layer is pre-lithiated in whole or in part, wherein the pre-lithiated conductive layer comprises a diffusion region, and the lithium diffusion region is about 1% to about 100% of the total thickness of the pre-lithiated conductive layer. After the pre-lithiated conductive layer is formed, the negative electrode active material slurry is coated on the pre-lithiated conductive layer and cured to form the negative electrode of lithium ion secondary battery of the present invention. The negative electrode of lithium ion secondary battery prepared by the method of the present invention comprises a pre-lithiated conductive layer. Due to its high lithium content, it has excellent conductive properties, which may effectively improve the conductivity of the conductive layer, and therefore increase the first discharge capacity and the initial cycle efficiency of the lithium ion secondary battery. In addition, in the formed pre-lithiated conductive layer, the pre-lithiated material and the conductive layer material form a mutually permeable lithium diffusion region, thus the interlayer peeling phenomenon in the process of use may be effectively prevented, so as to provide good negative electrode plate adhesion.

In various embodiments of the present invention, in step S2, the pre-lithiation comprises any one of the following: laminating a lithium foil or lithium powder to the conductive layer; coating the molten lithium on the conductive layer and cooling to form a lithium layer; electroplating lithium to the negative electrode current collector and the surface of the conductive layer. In some embodiments, after the conductive layer is formed on the negative electrode current collector, the lithium foil or lithium powder is laminated to the conductive layer to form a laminated structure of the layer formed by the lithium foil or lithium powder and the conductive layer. In some preferred embodiments, after laminating the lithium foil or lithium powder, the operation of coating the conductive layer material, curing and further laminating the layer of the lithium foil or lithium powder may be repeated, so as to form a multilayer laminated structure containing the lithium layer and the conductive layer. In some other embodiments, the conductive layer is firstly formed on the negative electrode current collector, and then the molten lithium is coated on the conductive layer. After the lithium layer is completely cooled, the negative electrode active material is formed on the cooled lithium coating. Further, in the preferred embodiment, a conductive layer may be formed on the lithium layer after the lithium layer is formed, so as to form a multilayer structure of conductive layer-lithium layer-conductive layer. In other embodiments, after a conductive layer is formed on the negative electrode current collector, the negative electrode current collector formed with the conductive layer and the metal lithium may be immersed in a solution containing lithium ions (preferably lithium ion secondary battery electrolyte), and the positive electrode and the negative electrode of the power supply may be connected to the negative electrode current collector and the metal lithium through wires, respectively. After the power is turned on, the metal lithium will be electroplated to the conductive layer and the negative electrode current collector, respectively. In the above three methods of the present invention, the formed conductive layer may be subjected to surface treatment after forming step S1, so as to increase the surface adhesion with the later formed lithium layer and further increase the adhesion of the negative electrode plate formed therefrom. In some embodiments of forming a multilayer laminated structure, the lithium layer may completely penetrate into the conductive layer and/or negative electrode current collector adjacent thereto, so as to form a uniform pre-lithiated conductive layer without a separate unpenetrated lithium layer.

In various embodiments of the present invention, the thickness of the pre-lithiated conductive layer is in a range of about 1 to about 50 μM, preferably about 1 to about 20 μM, and more preferably about 1 to about 10 μM. When the thickness of the pre-lithiated conductive layer is less than about 1 μM, the pre-lithiation effect is poor, thus it may not effectively improve the conductivity of the conductive layer. When the thickness of the pre-lithiated conductive layer is greater than about 50 μM, the conductive layer is too thick, so it may hinder the penetration of lithium ions, adversely increase the resistance and reduce the energy density of the battery, so as to degrade the electrical performance of the lithium ion secondary battery.

In various embodiments of the present invention, the lithium foil or lithium powder is laminated to the conductive layer under vacuum, drying conditions or dew point ≤−40° Cconditions at a temperature range of about −50° C. to about 40° C. In the embodiment of laminating lithium foil or lithium powder to pre-lithiate the conductive layer, due to the active nature of metal lithium, the lamination operation is needed to be carried out in a completely dry vacuum environment or a vacuum environment at a dew point ≤−40° C.

In various embodiments of the present invention, the molten lithium is coated on the conductive layer at a temperature range of about 180° C. to about 400° C. and cooled at a temperature range of about −20° C. to about 40° C. In the embodiment in which the molten lithium is used for coating on pre-lithiate the conductive layer, since the melting point of lithium is 180° C., it is necessary that the lithium is firstly molten into liquid at a temperature higher than 180° C., preferably about 180° C. to about 400° C., and then the molten lithium is coated on the conductive layer. When the temperature of the molten lithium is higher than about 400° C., the conductive layer or the negative electrode current collector may be damaged, so as to degrade the performance of the lithium ion secondary battery. After the lithium is coated, it may be cooled at a temperature range of about −20° C. to about 40° C. to form a lithium layer. Preferably, cooling is performed at a temperature range of about 10° C. to about 30° C. to form a lithium layer.

In various embodiments of the present invention, the surface of the negative electrode current collector and the conductive layer are immersed in a solution containing lithium salt and electroplated at a voltage greater than 0 V and less than or equal to about 1.5 V for about 1 minute to about 600 minutes. In an embodiment in which the lithium plating is used to pre-lithiate the conductive layer and the negative electrode current collector, after the negative electrode current collector formed with a conductive layer and the lithium layer are immersed in a solution containing lithium ions, electroplating is carried out at a voltage greater than 0 V and less than or equal to about 1.5 V, and the electroplating time may be in a range of about 1 minute to about 600 minutes. In some preferred embodiments, the lithium thin layer may be formed by electroplating for about 1 to about 30 minutes at a smaller voltage of, for example, about 0.1 V to about 0.5 V. The operations of forming the conductive layer and the lithium electroplating are repeated to form an alternating structure of the conductive layer and the lithium plating layer. In the embodiment of the primary molded lithium plating layer, a voltage of about 1 V to about 1.5 V is used for electroplating for about 1 hour to about 10 hours. In some embodiments of the present invention, the solution of the lithium salt comprises $LiPF_6$, $LiBF_4$, $LiAsF_6$, $LiClO_4$, $LiB(C_6H_6)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, lithium difluoro[oxalato-O,O']borate, lithium bis(oxalate)borate, or $LiBr$, or any combination thereof. In a preferred embodiment, the lithium salt is $LiPF_6$.

According to another typical embodiment of the present invention, a lithium ion secondary battery is provided, including a positive electrode, a negative electrode, a separator, and a non-aqueous electrolyte, wherein the negative electrode is the negative electrode of the lithium ion secondary battery provided by the present invention or the negative electrode of the lithium ion secondary battery prepared according to the method of the present invention. Where the negative electrode of the present invention or the negative electrode prepared according to the method of the present invention is used, the negative electrode plate of the lithium ion secondary battery has good electrode plate adhesion, and may achieve excellent first discharge capacity and initial cycle efficiency.

The present invention will be described in further detail below in combination with specific examples, which may not be understood as limiting the protection scope claimed by the present invention.

Example 1

Preparation of Negative Electrode

Under vacuum and completely drying conditions, 10.0 g of polyvinylidene fluoride binder, 55.0 g of carbon black, 15.0 g of graphite conductive agent and 80.0 g of passivated lithium powder are weighed and added into 640.0 g of N-methylpyrrolidone at a temperature of 20° C., and stirred at a stirring speed of 100 rpm for 60 minutes to obtain a pre-lithiated conductive coating slurry, solid content of the slurry is 20.0% (wt/wt). The pre-lithiated conductive coating slurry is coated on a copper foil that is used as the negative electrode current collector, and the pre-lithiated conductive coating slurry is cured at 120° C. to form a pre-lithiated conductive layer. The thickness of the obtained pre-lithiated conductive layer is about 5 μM. The amount of the passivated lithium powder is 50.0 wt % of the dry weight of the pre-lithiated conductive layer.

Under vacuum and completely drying conditions, 80.0 g of graphite negative electrode material, 13.0 g of silicon-based negative electrode material, 2.0 g of graphite conductive agent and 5.0 g of polyvinylidene fluoride binder are weighed and added into 122.0 g of N-methylpyrrolidone at the temperature of 20° C., and stirred evenly to obtain the negative electrode active material slurry. The negative electrode active material slurry is coated on the pre-lithiated conductive layer and cured at 120° C. to form a negative electrode active material layer.

A stamping molding process is applied to the negative electrode current collector formed with a pre-lithiated conductive layer and a negative electrode active material layer to form a negative electrode plate.

Preparation of Positive Electrode 94.5 g of composite positive electrode active material, 2.0 g of graphite conductive agent and 2.5 g of polyvinylidene fluoride binder are mixed to obtain a positive electrode mixture, and the obtained positive electrode mixture is dispersed in 33.0 g of N-methylpyrrolidone to obtain a positive electrode mixture slurry. Subsequently, a positive electrode mixture slurry is coated on the aluminum foil to obtain a positive electrode current collector. The positive electrode current collector is dried and the positive electrode plate is formed by stamping molding process.

Preparation of Electrolyte 15.0 g of ethylene carbonate, 70.0 g of dimethyl carbonate and 15.0 g of lithium hexafluorophosphate are mixed to prepare the electrolyte.

Battery Assembly

CR2016 button battery is assembled in a dry laboratory. The positive electrode plate obtained in the above steps is used as the positive electrode and the negative electrode plate obtained in the above steps is used as the negative electrode. The positive electrode, negative electrode and separator are assembled with a battery case of the button battery and an electrolyte is injected therein. After being assembled, the battery rests for 24 h to be aged, so as to obtain a lithium nickel-cobalt manganate button battery.

Example 2

The lithium ion secondary battery is prepared by the similar method as Example 1 except that:

under vacuum and dew point ≤−40° C. conditions, 10.0 g of polyvinylidene fluoride binder, 55.0 g of carbon black, 15.0 g of graphite conductive agent and 8.89 g of passivated lithium powder are weighed and added into 800.0 g of N-methylpyrrolidone at a temperature of 10° C., and stirred at a stirring speed of 2000 rpm for 2 minutes to obtain a pre-lithiated conductive coating slurry, solid content of the slurry is 10.0% (wt/wt). The pre-lithiated conductive coating slurry is coated on a copper foil that is used as the negative electrode current collector, and the pre-lithiated conductive coating slurry is cured at 120° C. to form a pre-lithiated conductive layer. The thickness of the obtained pre-lithiated conductive layer is about 1 μM. The amount of the passivated lithium powder is 10.0 wt % of the dry weight of the pre-lithiated conductive layer.

Example 3

The lithium ion secondary battery is prepared by the similar method as Example 1 except that:

Under vacuum and completely drying conditions, 10.0 g of polyvinylidene fluoride binder, 55.0 g of carbon black, 15.0 g of graphite conductive agent and 20.0 g of passivated lithium powder are weighed and added into 566.7 g of N-methylpyrrolidone at a temperature of −20° C., and stirred at a stirring speed of 1000 rpm for 2880 minutes to obtain a pre-lithiated conductive coating slurry, solid content of the slurry is 15.0% (wt/wt). The pre-lithiated conductive coating slurry is coated on a copper foil that is used as the negative electrode current collector, and the pre-lithiated conductive coating slurry is cured at 120° C. to form a pre-lithiated conductive layer. The thickness of the obtained pre-lithiated conductive layer is about 10 μM. The amount of the passivated lithium powder is 20.0 wt % of the dry weight of the pre-lithiated conductive layer.

Example 4

Preparation of Negative Electrode

Under vacuum and dew point ≤−40° C. conditions, 10.0 g of polyvinylidene fluoride binder, 55.0 g of carbon black and 15.0 g of graphite conductive agent are weighed and added into 720.0 g of N-methylpyrrolidone at a temperature of 0° C., and stirred at a stirring speed of 50 rpm for 2880 minutes to obtain a conductive coating slurry, solid content of the slurry is 10.0% (wt/wt). The conductive coating slurry is coated on a copper foil that is used as the negative electrode current collector, and the conductive coating slurry is cured at 100° C. to form a conductive layer.

80.0 g of passivated lithium powder is evenly placed on the conductive layer, and the passivated lithium powder is stamped into the conductive layer by a stamping process, so as to form a pre-lithiated conductive layer. The thickness of the obtained pre-lithiated conductive layer is about 10 μM. In the pre-lithiated conductive layer, the amount of the lithium powder is 50.0 wt % of the dry weight of the pre-lithiated conductive layer.

Under vacuum and completely drying conditions, 80.0 g of graphite negative electrode material, 13.0 g of silicon-based negative electrode material, 2.0 g of graphite conductive agent and 5.0 g of polyvinylidene fluoride binder are weighed and added into 122.0 g of N-methylpyrrolidone at the temperature of 20° C., and stirred evenly to obtain the negative electrode active material slurry. The negative electrode active material slurry is coated on the pre-lithiated conductive layer and cured at 120° C. to form a negative electrode active material layer.

A stamping molding process is formed for the negative electrode current collector formed with a pre-lithiated conductive layer and a negative electrode active material layer to form a negative electrode plate.

Preparation of Positive Electrode 94.5 g of composite positive electrode active material, 2.0 g of graphite conductive agent and 2.5 g of polyvinylidene fluoride binder are mixed to obtain a positive electrode mixture, and the obtained positive electrode mixture is dispersed in 33.0 g of N-methylpyrrolidone to obtain a positive electrode mixture slurry. Subsequently, a positive electrode mixture slurry is coated on the aluminum foil to obtain a positive electrode current collector. The positive electrode current collector is dried and the positive electrode plate is formed by stamping molding process.

Preparation of Electrolyte 15.0 g of ethylene carbonate, 70.0 g of dimethyl carbonate and 15.0 g of lithium hexafluorophosphate are mixed to prepare the electrolyte.

Battery Assembly

CR2016 button battery is assembled in a dry laboratory. The positive electrode plate obtained in the above steps is used as the positive electrode and the negative electrode plate obtained in the above steps is used as the negative electrode. The positive electrode, negative electrode and separator are assembled with a battery case of the button battery and an electrolyte is injected therein. After being assembled, the battery rests for 24 h to be aged, so as to obtain a lithium nickel-cobalt manganate button battery.

Example 5

The lithium ion secondary battery is prepared by the similar method as Example 4 except that:

under vacuum and completely drying conditions, 10.0 g of polyvinylidene fluoride binder, 55.0 g of carbon black, and 15.0 g of graphite conductive agent are weighed and added into 453.3 g of N-methylpyrrolidone at a temperature of 10° C., and stirred at a stirring speed of 2000 rpm for 10 minutes to obtain a conductive coating slurry, solid content of the slurry is 15.0% (wt/wt). The conductive coating slurry is coated on a copper foil that is used as the negative electrode current collector, and the conductive coating slurry is cured at 110° C. to form a conductive layer.

8.89 g of passivated lithium powder is evenly placed on the conductive layer, and the lithium powder is stamped into the conductive layer by a stamping process, so as to form a pre-lithiated conductive layer. The thickness of the obtained pre-lithiated conductive layer is about 5 μM. In the pre-lithiated conductive layer, the amount of the passivated lithium powder is 10.0 wt % of the dry weight of the pre-lithiated conductive layer.

Example 6

The lithium ion secondary battery is prepared by the similar method as Example 4 except that:

under vacuum and dew point ≤−40° C. conditions, 10.0 g of polyvinylidene fluoride binder, 55.0 g of carbon black and 15.0 g of graphite conductive agent are weighed and added into 320.0 g of N-methylpyrrolidone at a temperature of 15° C., and stirred at a stirring speed of 1500 rpm for 30 minutes to obtain a conductive coating slurry, solid content of the slurry is 20.0% (wt/wt). The conductive coating slurry is coated on a copper foil that is used as the negative electrode current collector, and the conductive coating slurry is cured at 120° C. to form a conductive layer.

20.0 g of passivated lithium powder is evenly placed on the conductive layer, and the lithium powder is stamped into the conductive layer by a stamping process, so as to form a pre-lithiated conductive layer. The thickness of the obtained pre-lithiated conductive layer is 1 μM. In the pre-lithiated conductive layer, the amount of the passivated lithium powder is 20.0 wt % of the dry weight of the pre-lithiated conductive layer.

Example 7

The lithium ion secondary battery is prepared by the similar method as Example 4 except that:

under vacuum and completely drying conditions, 10.0 g of polyvinylidene fluoride binder, 55.0 g of carbon black, and 15.0 g of graphite conductive agent are weighed and added into 364.4 g of N-methylpyrrolidone at a temperature of 20° C., and stirred at a stirring speed of 1000 rpm for 1440 minutes to obtain a conductive coating slurry, solid content of the slurry is 18.0% (wt/wt). The conductive coating slurry is coated on a copper foil that is used as the negative electrode current collector, and the conductive coating slurry is cured at 120° C. to form a conductive layer.

The lithium ingot is molten into liquid lithium at a temperature of 200° C., and then the liquid lithium is coated on the surface of the formed conductive layer by extrusion coating to form a lithium layer. Then, the molten lithium is cooled to a solid state at a temperature of 20° C. The thickness of the obtained pre-lithiated conductive layer is about 5 μM. In the pre-lithiated conductive layer, the amount of the lithium is 20.0 wt % of the dry weight of the pre-lithiated conductive layer.

Example 8

The lithium ion secondary battery is prepared by the similar method as Example 4 except that:

under vacuum and completely drying conditions, 10.0 g of polyvinylidene fluoride binder, 55.0 g of carbon black, and 15.0 g of graphite conductive agent are weighed and added into 535.4 g of N-methylpyrrolidone at a temperature of 10° C., and stirred at a stirring speed of 500 rpm for 1800 minutes to obtain a conductive coating slurry, solid content of the slurry is 13.0% (wt/wt). The conductive coating slurry is coated on a copper foil that is used as the negative electrode current collector, and the conductive coating slurry is cured at 120° C. to form a conductive layer.

20.0 g of lithium foil is evenly placed on the conductive layer, and the lithium foil is stamped into the conductive layer by a stamping process, so as to form a pre-lithiated conductive layer. The thickness of the obtained pre-lithiated conductive layer is about 5 μM. In the pre-lithiated conductive layer, the amount of the lithium foil is 20.0 wt % of the dry weight of the pre-lithiated conductive layer.

Example 9

The lithium ion secondary battery is prepared by the similar method as Example 4 except that:

under vacuum and completely drying conditions, 10.0 g of polyvinylidene fluoride binder, 55.0 g of carbon black, and 15.0 g of graphite conductive agent are weighed and added into 420.0 g of N-methylpyrrolidone at a temperature of 0° C., and stirred at a stirring speed of 100 rpm for 600 minutes to obtain a conductive coating slurry, solid content of the slurry is 16.0% (wt/wt). The conductive coating slurry is coated on a copper foil that is used as the negative electrode current collector, and the conductive coating slurry is cured at 90° C. to form a conductive layer.

15.0 g of ethylene carbonate, 70.0 g of dimethyl carbonate and 15.0 g of lithium hexafluorophosphate are mixed evenly to form an electrolyte. The obtained electrolyte is used to soak the negative electrode current collector formed with a conductive coating for 60 minutes. After the negative electrode current collector formed with a conductive coating is fully soaked, the lithium sheet is immersed in the electrolyte, in which the lithium sheet is not in direct contact with the negative electrode current collector formed with a conductive coating. The lithium sheet is connected with the negative electrode of the power supply through the wire, and the negative electrode current collector is connected with the positive electrode of the power supply through the wire. Electroplating process is applied at a voltage of 1.0 volts for 60 minutes. Thus, a lithium layer is formed on both the conductive layer and the surface of the negative electrode current collector in contact with the electrolyte. In the process of lithium electroplating, the lithium layer and the conductive layer contacted therewith interpenetrate to form a pre-lithiated conductive layer. The thickness of the obtained pre-lithiated conductive layer is about 5 μM. In the pre-lithiated conductive layer, the amount of the lithium is 20.0 wt % of the dry weight of the pre-lithiated conductive layer. The thickness of the lithium layer on the negative electrode current collector is about 2 μM.

Comparative Example 1

The lithium ion secondary battery is prepared by the similar method as Example 1 except that:

Vulcanized polyacrylonitrile, butadiene styrene rubber and carboxymethyl cellulose are uniformly mixed with water as solvent in a mass ratio of 90:5:5 to make a slurry. The slurry is coated on the current collector copper foil with a coating thickness of about 10 μM. After the solvent is evaporated, the copper foil is stamped into a electrode plate. The electrode plate, separator and metal lithium are assembled into a button battery in the glove box under protection of argon, and the electrolyte of 1.0 M lithium bis(trifluoromethanesulphonyl)imide and 1.0% (wt/wt) mass concentration of lithium nitrate in 1,3-dioxolane and ethylene glycol dimethyl ether (with a volume ratio of 1:1). Electrodeposition is performed for 11 hours after energization to deposit the metal lithium on the surface of the current collector. After the metal lithium deposition is complete, the battery is disassembled and the current collector deposited with metal lithium is taken out. The resulting current collector is used as the negative electrode.

Comparative Example 2

The lithium ion secondary battery is prepared by the similar method as Example 1 except that:

The mixture of lithium phosphide and silicon carbon negative electrode material, conductive carbon black and SBR are mixed according to the mass ratio of 8:1:1 to formulate a slurry, in which the mass ratio of silicon carbon dye to lithium phosphide is 9:1. The obtained slurry is coated on the negative electrode current collector of copper foil and dried under vacuum at 120° C. for 12 hours to obtain the negative electrode plate.

Test of Battery Performance

Test of First Discharge Capacity (mAh/g)

The first discharge capacities of the lithium ion secondary batteries produced by the above described Examples and Comparative Examples are measured as follows. The batteries are charged at conditions of an ambient temperature of 23° C., a charging voltage of 4.35 V, a charging current of 0.5 mA and a charging time of 10 hours, then discharged at conditions of a discharge current of 2.5 mA and a termination voltage of 3.0 V, and the first discharge capacity (discharge capacity of the first cycle) is measured. The experimental results are shown in Table 1.

Test of First Time Efficiency

The first time efficiency of the lithium ion secondary batteries produced by the Examples and Comparative Examples is calculated by the following calculation formula:

$$\text{First time efficiency} = \text{First discharge capacity} / \text{First charge capacity}$$

Among them, the First charge capacity is 0.5 mA×10 h=5 mAh. The experimental results are shown in Table 1.

Test of Peel Strength of Negative Electrode Plate

The negative electrode plate produced by the above described Examples and Comparative Examples is removed from the CR2016 button battery. The peel strength of the negative electrode plates is measured with a tensile tester, in which the peel speed is 10 mm/min, the load is 10N, and the peel angle is 180 degrees. The tensile tester is Shanghai Hengyi microcomputer controlled electronic universal material testing machine (Model: HY-0230). The experimental results are shown in Table 1.

TABLE 1

| | Amount of Pre-lithiated Material | Thickness of Pre-lithiated Conductive Layer (approx.) | First discharge capacity | First time efficiency | Peel strength |
|---|---|---|---|---|---|
| Example 1 | 50.0 wt % | 5 μM | 482 mAh | 86.2% | 50 mN/mm |
| Example 2 | 10.0 wt % | 1 μM | 480 mAh | 85.5% | 45 mN/mm |
| Example 3 | 20.0 wt % | 10 μM | 485 mAh | 85.8% | 46 mN/mm |
| Example 4 | 50.0 wt % | 10 μM | 481 mAh | 86.0% | 48 mN/mm |
| Example 5 | 10.0 wt % | 5 μM | 487 mAh | 85.0% | 50 mN/mm |
| Example 6 | 20.0 wt % | 1 μM | 486 mAh | 85.4% | 46 mN/mm |
| Example 7 | 20.0 wt % | 5 μM | 484 mAh | 86.0% | 47 mN/mm |
| Example 8 | 20.0 wt % | 5 μM | 485 mAh | 85.9% | 50 mN/mm |
| Example 9 | 20.0 wt % | 5 μM | 484 mAh | 85.7% | 49 mN/mm |
| Comparative Example 1 | | | 480 mAh | 82.0% | 46 mN/mm |
| Comparative Example 2 | | | 475 mAh | 81.0% | 30 mN/mm |

From the above description, it may be seen that the above described Examples of the present invention achieve the following technical effects:

In case of using the negative electrode of the lithium ion secondary battery of the present invention, since the negative electrode contains a pre-lithiated conductive layer, lithium ions are effectively supplemented during the battery cycle, thereby increasing the first discharge capacity and first time efficiency of the battery. In addition, since the pre-lithiated material of the present invention is contained in the conductive layer or has good binding force with the conductive layer, the resulting negative electrode has excellent negative electrode plate binding force, so as to avoid the problems such as delamination, cracking and the like, which may occur in the use of the negative electrode plate of the lithium ion secondary battery.

The above descriptions are only the optimal examples of the present disclosure, and are not intend to limit the present disclosure, various changes and modifications may be made to the present disclosure by those skilled in the art. Within spirits and principles of the present disclosure, any modifications, equivalent replacements, improvements, and the like shall fall within the scope of protection of the present disclosure.

The invention claimed is:

1. A negative electrode of lithium ion secondary battery, wherein, the negative electrode comprises:
   a negative electrode active material;
   a pre-lithiated conductive layer; and
   a negative electrode current collector,
   wherein the pre-lithiated conductive layer is a pre-lithiated material doped conductive material,
   wherein the pre-lithiated material doped conductive material includes a pre-lithiated material and a conductive material that are mixed to form a mixed homogeneous form, and
   wherein an amount of the pre-lithiated material is in a range of 10 wt % to 50 wt % based on a total weight of the pre-lithiated conductive layer.

2. The negative electrode of lithium ion secondary battery according to claim 1, wherein, a thickness of the pre-lithiated conductive layer is in a range of 1 μM to 50 μm.

3. The negative electrode of lithium ion secondary battery according to claim 1, wherein the amount of the pre-lithiated material is in the range of 10 wt % to 20 wt % based on the total weight of the pre-lithiated conductive layer.

4. The negative electrode of lithium ion secondary battery according to claim 1, wherein, the conductive material comprises carbon black, carbon nanotube, graphene, vapor grown carbon fiber, Ketjen black, polyacetylene, polythiophene, polypyrrole, polyaniline, polyphenylene, polyphenylene vinylene, polydiacetylene, or any combination thereof.

5. The negative electrode of lithium ion secondary battery according to claim 1, wherein, the negative electrode current collector comprises copper foil, copper mesh, foamy copper, nickel foil, nickel mesh, foamy nickel, stainless steel foil, stainless steel mesh, or any combination thereof.

6. The negative electrode of lithium ion secondary battery according to claim 3, wherein, the pre-lithiated conductive layer is a laminate of the pre-lithiated material layer and the conductive material layer, wherein the pre-lithiated conductive layer comprises a lithium diffusion region and the lithium diffusion region is 1% to 100% of the total thickness of the pre-lithiated conductive layer.

7. The negative electrode of lithium ion secondary battery according to claim 1, wherein, the negative electrode current collector is a pre-lithiated negative electrode current collector.

8. A lithium ion secondary battery, wherein, the lithium ion secondary battery comprises:

a positive electrode, a negative electrode a separator, and a nonaqueous electrolyte, wherein the negative electrode is the negative electrode of lithium ion secondary battery according to claim 1.

\* \* \* \* \*